Jan. 11, 1966 R. M. LEE 3,229,264
STAGGERED-CORE MEMORY
Filed April 9, 1962 3 Sheets-Sheet 1

ROBERT M. LEE
*INVENTOR.*

BY Byard G. Nilsson

Jan. 11, 1966 R. M. LEE 3,229,264

STAGGERED-CORE MEMORY

Filed April 9, 1962 3 Sheets-Sheet 2

ROBERT M. LEE
*INVENTOR.*

BY Byard G. Nilsson

ROBERT M. LEE
INVENTOR.

BY Byard G. Nilsson

3,229,264
STAGGERED-CORE MEMORY

Robert M. Lee, Los Gatos, Calif., assignor, by mesne assignments, to Control Data Corporation, Minneapolis, Minn., a corporation of Minnesota Filed Apr. 9, 1962, Ser. No. 186,164
2 Claims. (Cl. 340—174)

The present invention relates to a static-magnetic coincident-current memory system wherein magnetic elements or cores are variously magnetized to represent intelligence.

It has been previously proposed to employ magnetic elements having two stable states in a static-magnetic, coincident-current memory system. The magnetic elements are normally formed of material having a somewhat rectangular hysteresis loop, so that a change in state occurs only when a magnetic element is subjected to a magnetizing force above some threshold level. This criterion enables the construction of systems wherein selected elements may be changed in state without affecting other elements in the system. For example, the elements may be mounted in a two-dimensional array wherein each column and each row is driven by a single electrical conductor, and the state of a selected element may be changed by passing electrical currents through the row conductor and the column conductor which link the selected element. As a result of the threshold magnetizing characteristic of the elements, the unselected elements are not affected because the currents in the conductors are not individually great enough to provide the threshold magnetizing force.

Various arrangements have been developed for coincident-current memory systems, and one such arrangement is shown and described in the Journal of Applied Physics, volume 22, pages 44 through 48, January 1951, and in United States Patent 2,736,880 issued February 28, 1956, to J. W. Forrester.

In the prior coincident-current magnetic memory systems, as disclosed in the above references, the individual cores are arranged in rectangular arrays which may in turn be stacked into three-dimensional stacks. Normally, each of the cores is magnetically linked to three different conductors, i.e. a conductor associated with particular rows (customarily designated as the X conductor) a conductor associated with particular columns (customarily designated the Y conductor) and a sense-inhibit conductor which is magnetically coupled to all the cores in a plane.

Of course, variations of this arrangement have been proposed; however, normally the three conductors are desired. The physical form of prior coincident-current magnetic memories has been a rectangular array of the magnetic elements which are normally in toroidal form with the X and Y conductors passing at right angles through the individual toroidal cores. The third conductor is then passed through all the cores in a rectangular plane and care must be taken to wind that conductor into the plane to minimize spurious signals induced in the sense conductor.

In view of the small size of the cores, considerable difficulty has been encountered in threading the conductors through the cores to form the array. This difficulty is emphasized by the fact that the X and Y conductors normally pass through the cores at right angles to each other and off-set 45 degrees from the axis of the toroidal core.

In general, the present invention provides a structure for a coincident-current core memory, wherein the difficulty of threading the conductors through the cores is substantially reduced. In the system, the cores are arranged in planes which are in the form of a non-rectangular parallelogram. As a result, the cores are off-set so that two of the three conductors employed, pass through the core parallel to the axis of the core. Furthermore, the invention contemplates the preforming of the third conductor which passes through the cores at an angle to the axis so the interference offered by the other windings is reduced. Still further, the system contemplates an arrangement wherein the noise induced in the sense winding through capacitive and inductive coupling between conductors is reduced while providing greater flexibility in the placement of the sensing winding.

Various objects and advantages of the present invention will become apparent from the following detailed description when taken in conjunction with the accompanying drawings, in which.

Figure 1:
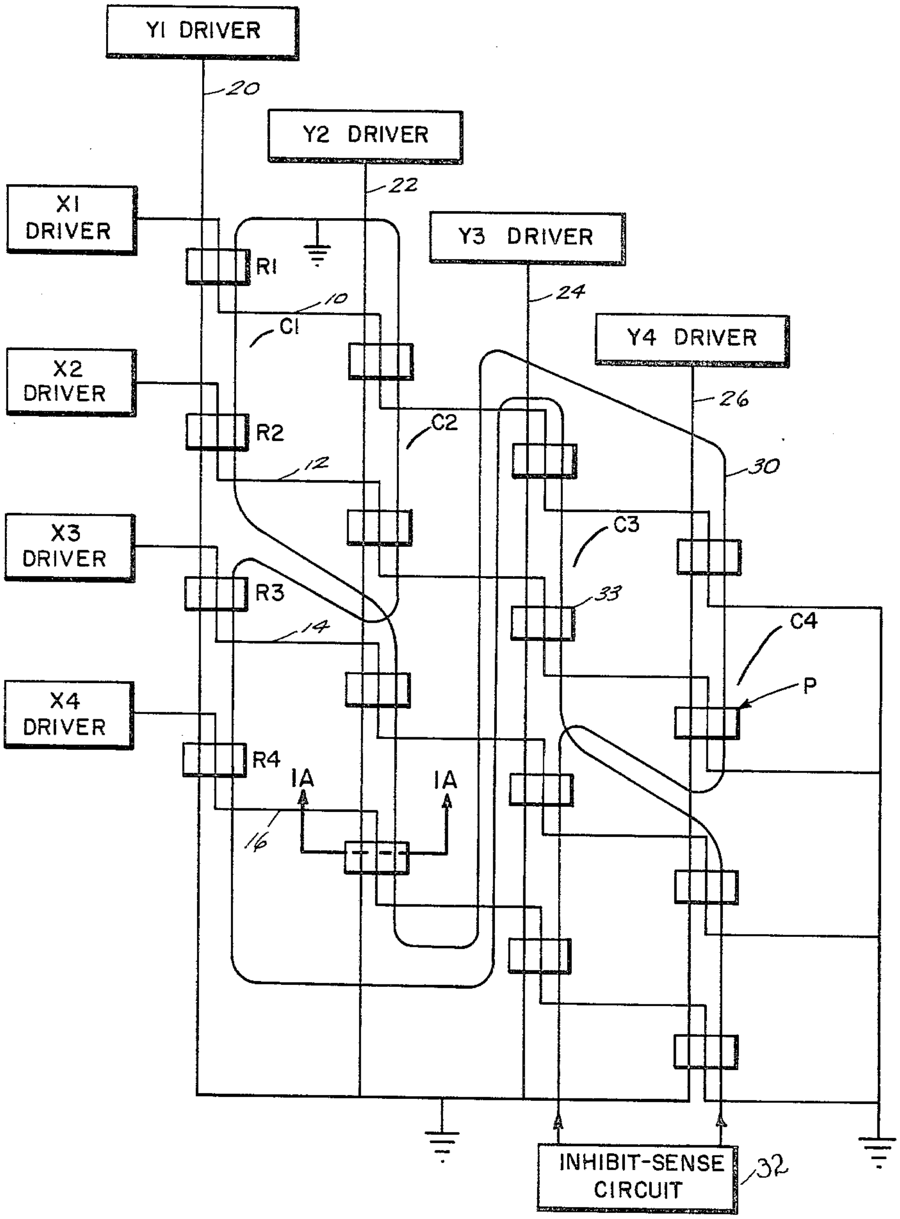
FIG. 1 is a diagrammatic plan view of one form of the present invention.

Referring initially to FIG. 1, there is shown a single plane P of toroidal cores arranged in a non-rectangular parallelogram configuration. The individual cores are formed of material having a substantially rectangular hysteresis loop as described in the above-referenced patent and are arranged in columns C1, C2, C3, and C4 and rows R1, R2, R3, and R4 to form a non-rectangular parallelogram. The cores in each of the rows are magnetically coupled to a single conductor which is in turn connected to a driver circuit. Specifically, the cores in the rows R1, R2, R3, and R4, are magnetically coupled respectively to conductors 10, 12, 14, and 16, which are in turn respectively connected to two-way driver circuits X1, X2, X3, and X4. Various forms of such driver circuits are well known in the prior art, and exemplary circuits are shown and described in the "Proceedings of the Western Joint Computer Conference" held at Los Angeles, California, February 26 through 28, 1957, and published by the Institute of Radio Engineers.

The cores are also driven by a number of similar column drivers, i.e. drivers Y1, Y2, Y3, and Y4, respectively connected through the cores in columns C1, C2, C3, and C4, by conductors 20, 22, 24, and 26, respectively. Each of the conductors 10, 12, 14, 16, 20, 22, 24, and 26 are connected to ground potential at the end remote from an associated driver circuit.

In addition to the conductors considered above, all the cores in the plane P are coupled to a sense-inhibit conductor 30 which is in turn connected to an inhibit-sense circuit 32, one form of which is shown in the above-referenced publication. In function the inhibit driver circuit provides a current in conductor 30 to represent a binary "zero" during register operations, and may receive a pulse from that conductor during read-out operations to manifest a binary "one."

In considering the configuration of FIG. 1, it is to be noted that the conductor 30 and the conductors from the Y driver circuits all pass through the individual cores of the plane parallel to the axis of these cores. This consideration results in substantial ease in manufacturing coincident-current magnetic memory systems with attendant economy. It is also to be noted, that the conductor 30 from the inhibit-sense circuit 32 is divided between the columns of the array. Specifically, the conductor 30 passes through two cores in a column and proceeds to two other cores of the next column. If the column had eight cores conductor 30 would pass through four cores in one column and then proceed to the next column. In this manner, the capacitive and inductive coupling between the conductors from the Y drivers and the conductor 30 is balanced.

In the assembly of the structure as shown in FIG. 1, the individual cores may be variously supported while the conductors are passed therethrough. If the transverse conductors, e.g. conductors 10, 12, 14, and 16 are threaded first they will present some obstruction to the insertion of the other conductors, as conductors 20 and 30. The difficulty of inserting these transverse conductors is substantially reduced by preforming these conductors in a stepped configuration as shown in FIG. 1, because the stepped conductor can pass through the core occupying less space.

Although the general operating principles of systems of the type described in FIG. 1 are well known, the operation will be briefly described. In general, the system has two separate functions, registering a binary digit in a selected core, and reading the binary digit from a selected core. To register a digit in a selected core, the X and Y driver circuits which drive the selected core are both energized. These driver circuits collectively provide sufficient current to the conductors embracing the cores to cause the core to change its magnetic state, e.g. pass to a positive state, thereby causing it to register a binary "one." If such a binary "one" is to be registered, the inhibit-sense circuit 32 provides no current in the conductor 30, and the core does become magnetized to a positive state. However, if the core is to register a "zero," then a current is provided in the conductor 30 by the inhibit-sense circuit 32, which provides a magnetization opposed to the other conductors linking the core which maintains the core in a zero-indicating state.

In a specific example, the core 33 somewhat in the center of the array P is considered. The core 33 selected by energizing the drivers Y3 and X2, causing a current to flow through the conductors 12 and 24. The combined magnetization applied to the core 33 by the currents through the conductors 12 and 24 is sufficient to drive the core into a one-indicating state, and if it is desired to register a "one" then no current flows through the conductor 30 and the change in state is accomplished. However, if it is desired to maintain the core 33 in a zero-indicating state, a current is supplied through the conductor 30 which provides a magnetizing force opposed to the magnetizing forces provided by the conductors 12 and 24. As a result, the composite magnetizing force applied to the core 33 is inadequate to accomplish a change in state and the core remains in a zero-indicating state. Thus, the winding 30 acts to inhibit a change in state.

The other function of the system of FIG. 1 is to read-out or sense the contents of the core in the form of a binary digit. To accomplish this operation, the driver circuits are again selectively energized to isolate a particular core. It is to be noted that, during the read operation, the drivers provide a current through their associated conductors which flows in a direction to drive the cores to a negative magnetic state (opposite to the currents formed during the registration operation). Again considering the exemplary core 33, the reversed currents through the conductors 12 and 24 now tend to set the core in a zero-indicating negative state. If the core was previously in a one-indicating state, the transition is accomplished and as a result of the flux change in the core, a voltage is induced in the conductor 30 which is sensed by the inhibit-sense circuit 32 to provide an output signal indicative of a binary "one" digit. However, if the core 33 previously registered a "zero" digit, then the driving force provided by the conductors 12 and 24 does not accomplish sufficient flux change in the core 33 to induce a significant voltage in the conductor 30 and the absence of a pulse signal indicates a "zero" binary digit.

In the system of FIG. 1, the conductor 30 contains some rather long sections serving to return the wire to a desired point of entry with respect to a particular row or column. Of course, these long return wires are disadvantageous both from the structural and operating points of view. An embodiment of the system which avoids extended lengths of the sense-inhibit conductor 30 is shown in FIGS. 2 and 3, and will now be considered in detail.

Figure 2:
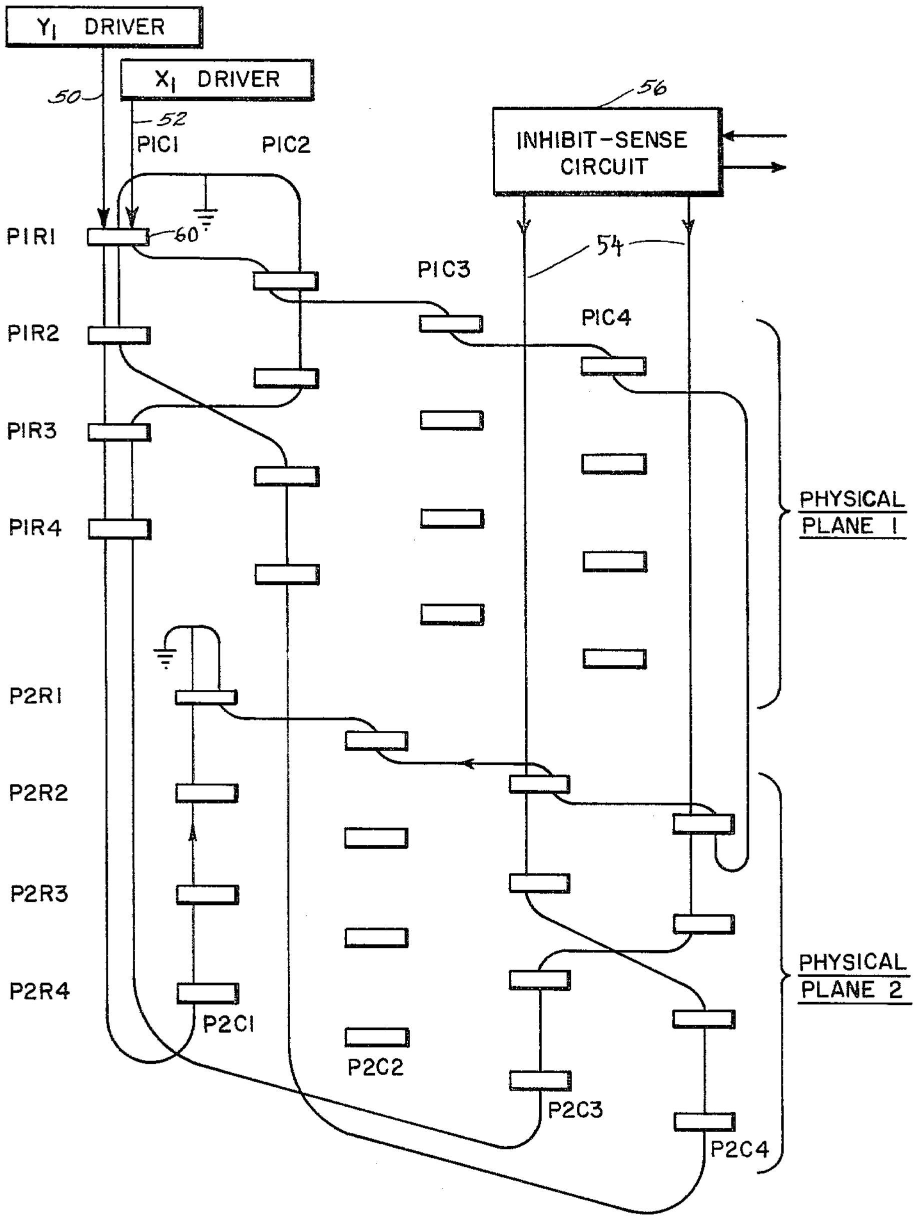
FIG. 2 is a partial diagrammatic representation of another form of the present invention.
Figure 3:
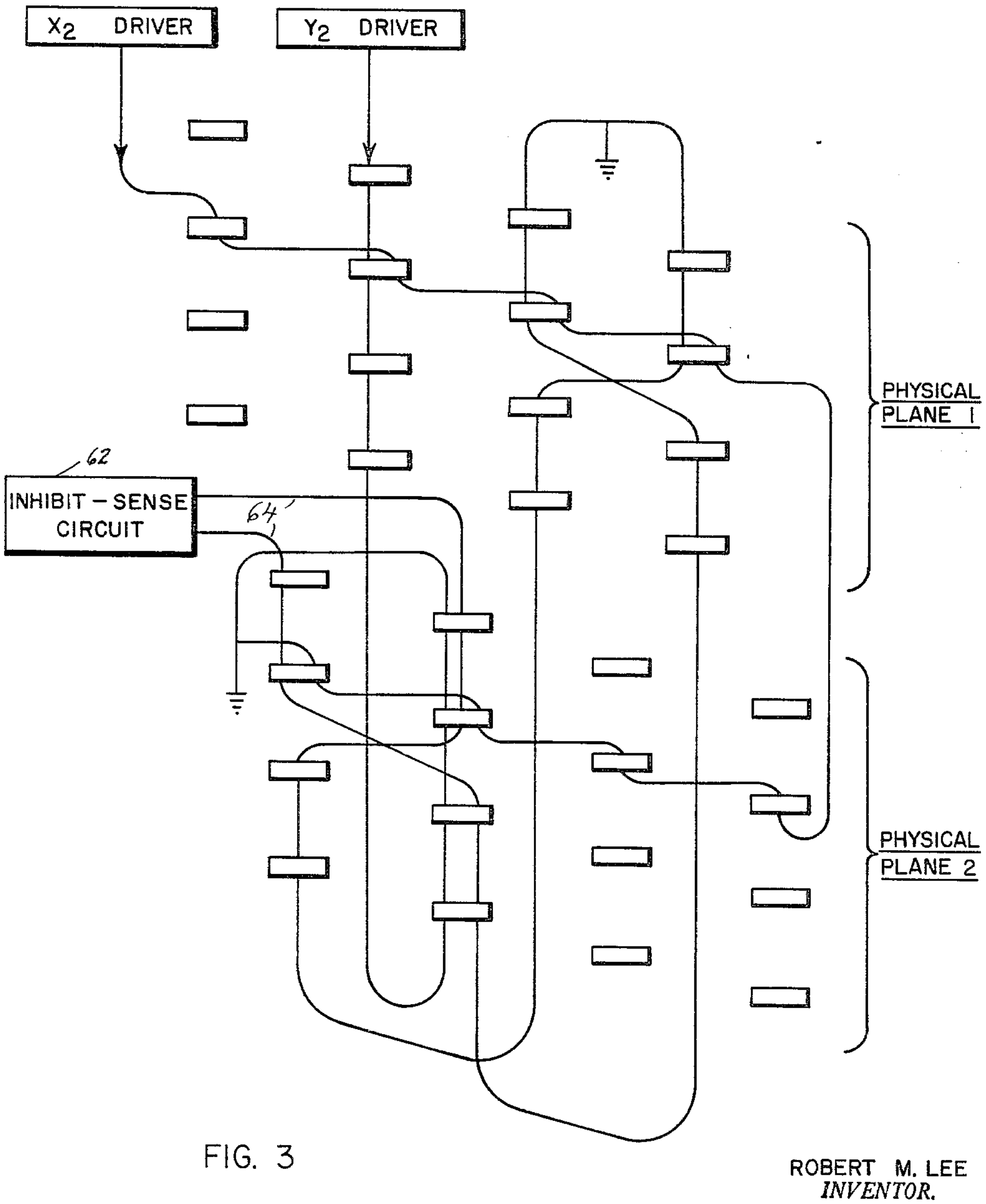
FIG. 3 is a partial diagrammatic representation of further structure of FIG. 2.

Referring to FIG. 2, there are shown first and second physical planes identified as plane 1 and plane 2. These planes each comprise a number of cores arranged in an array to form a non-rectangular parallelogram. In physical form, the physical plane 1 is positioned immediately above physical plane 2, that is, the cores in the row P1R1 (plane 1, row 1) are immediately above and in approximate alignment with the cores in the row P2R1 (plane 2, row 1). Similarly, the cores in the column P1C1 (plane 1, column 1) are immediately above and approximately aligned with the cores in the column P2C1 (plane 2, column 1). For convenience in mounting terminals and to minimize the obstruction presented by the terminals during the threading operation, it may be desirable to slightly shift the planes in relation to each other so that, for example, the row P1R1 is immediately above and in alignment with an imaginary line between P2R1 and P2R2. The presentation of the two planes in FIG. 2 is a somewhat distorted plan view to illustrate the manner in which the conductors embrace the various cores.

In prior three-dimensional coincident-current magnetic memory systems, it has been proposed to employ each plane of the stack to register one binary digit. For example, each separate physical plane in a stack of planes registers one binary digit of a binary word. In such an arrangement, the same column and row in each plane are energized during an operation thereby selecting all the cores in a particular location of each plane. This energization is normally accomplished by employing single drivers to drive all the similarly-positioned columns and rows in the memory stack. That is, the conduction which threads through a given row or column in one plane also threads the same row or column in the other planes.

In the system of FIG. 2 only representative driver circuits Y1 and X1 are shown to maintain the drawing legible; however, it is to be understood that a driver circuit is present for each set of rows and each set of columns in the stack. These driver circuits and associated conductors are placed as illustrated in FIG. 1 as considered hereafter.

The driver Y1 is connected to a conductor 50 which threads the cores of column P1C1, in one direction, and passes through the cores of column P2C1 in the reverse direction to be then connected to ground. A row driver circuit X1 drives the cores in row P1R1 in one direction and the cores in row P2R1 in another direction through a conductor 52. Of course, additional physical planes may be provided in which instance, the drivers Y1 and X1 will drive similar sets of cores in each subsequent plane.

In addition to the driver circuits recited above in connection with the conductors 50 and 52, other driver circuits are also provided; however, as indicated above these have been omitted to maintain the drawing legible. These drivers may be identified as follows:

| Circuit: | Couplings |
|---|---|
| Driver Y2 | Columns P1C2 and P2C2 |
| Driver Y3 | Columns P1C3, P2C3 |
| Driver Y4 | Columns P1C4 and P2C4 |
| Driver X2 | Rows P1R2, P2R2 |
| Driver X3 | Rows P1R3, P2R3 |
| Driver X4 | Rows P1R4, P2R4 |

In the system of FIG. 2, the manner of placing the inhibit-sense conductor 54, in conjunction with the non-rectangular parallelogram configuration of the planes is peculiar. The conductor 54 is connected to an inhibit-sense circuit 56 which functions to sense the voltages induced in the conductor 54 to manifest binary "one" digits, and to provide currents in the conductor 54 during intervals when a "zero" digit is to be registered in a selected core.

The manner of placing the conductor 54 results in very short lengths of return conductor thereby facilitating placement of the conductor and minimizing sections of this conductor which are subject to spurious induced signals. However, the placement of the conductor 54 so that it encounters cores in both the physical plane 1 and the physical plane 2 results in a logic plane which is made up of cores from both the physical plane 1 and the physical plane 2. That is, the cores embraced by the conductor 54 actually comprise one logic plane, and digits are selectively read from, and placed in these cores. It is to be noted, that the cores in the physical planes 1 and 2 which are not embraced by the conductor 54 comprise a second logic plane as disclosed in FIG. 3.

Considering the specific placement of the conductor 54, connection is made from the inhibit-sense circuit 56 through the two rear cores of the column P2C4, the conductor then passes through the two forward cores of the column P2C3 moving upwardly to then pass through the forward cores of the column P1C2 and then extends backward through the rear two cores of the column P1C1. The conductor is then at the rear of the stack and is grounded as it passes forward through the rear conductors of column P1C2 after which the conductor passes to the left through the forward conductors of column P1C1. The conductor then passes to the physical plane 2 and embraces the forward cores of column P2C3 and the rear cores of column P2C4 after which it is returned to the inhibit-sense circuit 56.

It is to be noted, that as an article of structure, the system of FIG. 2 has several distinct advantages. First, the conductor 50 passes through the toroidal cores in a direction parallel to the axis of the cores thereby facilitating the threading of the cores to a considerable extent. Furthermore, the conductor 54 passes through the cores parallel to their axis, again facilitating the threading of that conductor. The conductor 52, and similar conductors, may be preformed in a somewhat stepped configuration with the result that they will be easy to position. Still further, the capacitive and inductive intercoupling between the driver circuits and the inhibit-sense circuit are somewhat balanced. Specifically, for example, the conductor 50 passes through two cores in physical plane 1 along with the conductor 54 in one direction and passes through the next two cores in physical plane 1 with the conductor 54 in an opposite relative direction. Therefore, the small spurious signals induced in the conductor 54 by current pulses through the conductor 50 are balanced.

Considering a specific example of the operation of the system of FIG. 2, assume that it is desired to select the rearmost core 60 in the column P1C1. To accomplish this operation, the driver circuits X1 and Y1 are energized to produce currents through conductors 50 and 52 in a direction tending to drive the core 60 into positive saturation. If the inhibit-sense circuit during this interval is set to register a "one," then no current is passed through the conductor 54, and the core 60 is driven into positive saturation by the currents in the conductors 50 and 52, thereby registering a binary "one" digit. However, if the inhibit-sense circuit is set to register a binary "zero," then a current is passed by this circuit through the conductor 54 which provides a magnetizing force opposed to that provided by the conductors 50 and 52 with the result that the core 60 remains in a negative or zero-indicating magnetic state.

It is to be noted, that the conductor 54 operates in a similar fashion with regard to cores in the physical plane 2 as to cores in the physical plane 1; however, the direction of current flow is opposite in the two planes. As the conductors in the physical plane 1 pass the cores in a direction opposite to their direction through the cores in physical plane 2, the overall operation is the same.

Considering the above example further, the content of the core 60 is manifest by the driver circuits X1 and Y1 providing a current through the conductors 52 and 50 which tend to drive the core into negative saturation. If the core was previously set at a positive level (indicating a binary "one") the core undergoes a substantial flux change thereby inducing a voltage in the conductor 54 which is sensed by the inhibit-sense circuit 56 and manifest as a binary "one" digit. Conversely, if the core 60 is set at a negative state, indicating a binary "zero," no substantial flux change is experienced and the inhibit-sense circuit manifest a "zero" digit.

Considering the system of FIG. 2 further, reference will be had to FIG. 3 which shows another part of the total system. The cores of physical planes 1 and 2 are shown with a different pair of driver circuits X2 and Y2 along with an inhibit-sense circuit 62 employed in conjunction with conductor 64 to function with the cores comprising the second logic plane. The operation of the portion of the system shown in FIG. 3 is similar to that shown in FIG. 2, again the driver circuits are only partly shown to maintain the drawing legible and the logic plane is indicated by the cores embraced by the conductor 64. Thus two distinct logic planes are provided which are shared between the two physical planes.

Consideration of the above systems clearly indicates that an important aspect of the present invention is a toroidal-core coincident-current memory system wherein several of the conductors pass through the toroidal cores parallel to the axis of the cores, thereby facilitating the threading of the cores.

Another important aspect of the present invention resides in the manner of placing the sensing winding wherein spurious signals are canceled.

Still another important consideration of the present invention resides in the manner of placing the various windings in a three-dimensional magnetic-core memory system wherein long return wires or conductors are avoided.

Figure 1A:
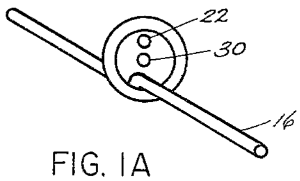
FIG. 1A is a sectional view along line 1A—1A of FIG. 1.

One other important consideration resides in the preformation of certain conductors, e.g. the X winding, to reduce physical interference to the other windings as shown in FIG. 1A.

A further important consideration resides in the fact that the number of terminals in the stack of memory units is reduced, and the terminals are distributed physically on the stack to obtain greater manufacturing ease.

One further important consideration resides in the fact that the various rows and columns can be variously spaced to facilitate a change of course by a conductor threading a row or column.

These and other important considerations will be evident from the system described, however, modifications and changes may be made thereto without departing from the spirit of the invention, which shall be defined by the following claims.

What is claimed is:

1. A coincident-current core memory unit for registering binary signals representative of numerical values for subsequent manifestation, comprising:

a plurality of toroidal cores, each having two stable magnetic states and each being physically oriented similarly to the others whereby the axes of all cores are in parallel relationship, said cores being arranged in columns, parallel said axes, and in parallel rows, the external of which said cores define a non-rectangular parallelogram;

a first set of electrical conductors aligned generally parallel to two opposed sides of said parallelogram and each passing through the cores in one row for magnetic coupling and physical support;

a second set of electrical conductors aligned generally parallel to the other opposed parallel sides of said parallelogram and each passing through the cores in a column for magnetic coupling and physical support;

a sense conductor magnetically coupled to all of said cores, passing through less than all of said cores in any row or column in the sequential row and column order of said cores in said row or column; and means for selectively energizing said conductors to alter the magnetic state of a selected core to thereby register a binary digit and to induce a voltage in said sensing conductor to provide an output signal representative of a binary digit registered therein.

2. A coincident-current core memory system including a plurality of coincident-current core memory units as defined in claim 1, and wherein each of said core memory units are physically positioned in a different plane.

References Cited by the Examiner

UNITED STATES PATENTS

| | | | |
|---|---|---|---|
| 2,933,720 | 4/1960 | Newhouse et al. | 340—174 |
| 3,070,707 | 12/1962 | Carter | 340—174 |
| 3,102,328 | 9/1963 | Schultz et al. | 340—174 |
| 3,104,317 | 9/1963 | Cochrane | 340—174 |
| 3,134,163 | 5/1964 | Luhn | 340—174 |

IRVING L. SRAGOW, *Primary Examiner.*